Aug. 16, 1938.  L. E. HODGES  2,127,030
BRAKE
Filed June 10, 1937   2 Sheets-Sheet 2
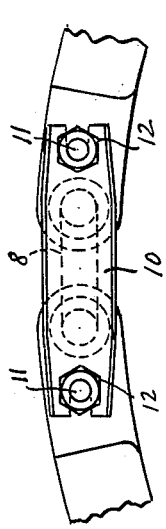
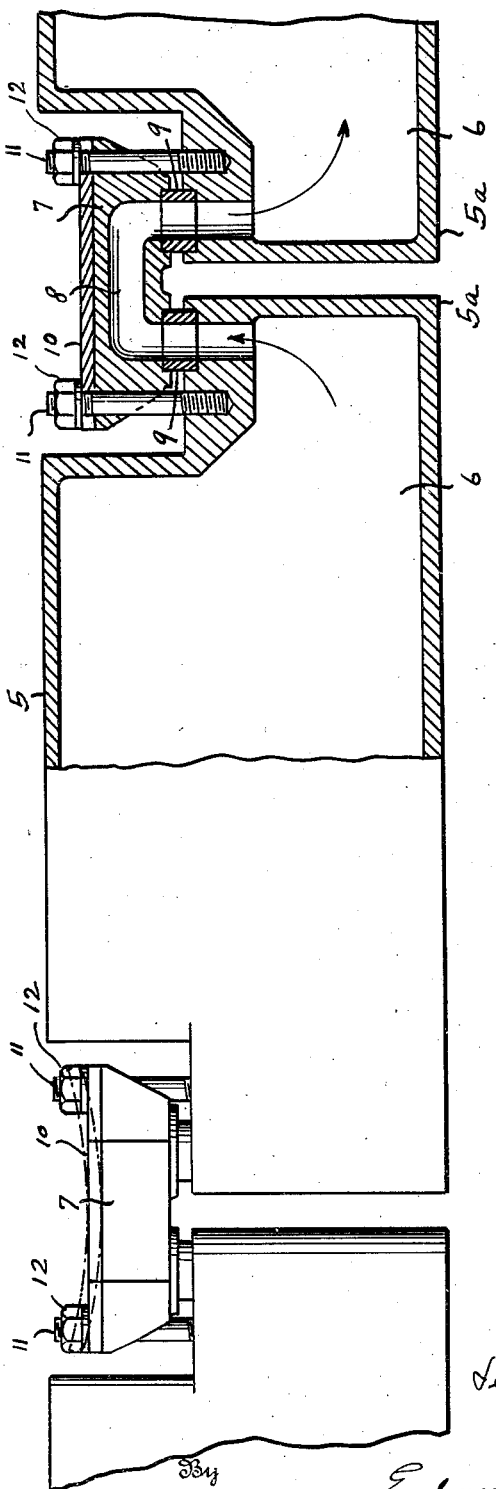

Patented Aug. 16, 1938

2,127,030

UNITED STATES PATENT OFFICE 2,127,030

BRAKE

Lester E. Hodges, Houston, Tex., assignor to Portable Rig Company, Houston, Tex., a corporation of Texas Application June 10, 1937, Serial No. 147,532

8 Claims. (Cl. 188—264)

This invention relates to brake mechanism and has particular relation to a novel type of brake band of such construction that a cooling fluid may be readily circulated therethrough.

An object of the invention is to provide in a brake band, a series of hollow sections flexibly connected together with novel means for connecting the sections, said connecting means having fluid conduits through which the cooling fluid may flow from section to section throughout the band.

It is another object of the invention to provide novel connections between the hollow brake band sections which will be fluid tight and which will be readily accessible for installation or removal.

With the above and other objects in view the invention has particular relation to certain novel features of construction, arrangement of parts and use, an example of which is given in this specification and illustrated in the accompanying drawings, wherein:—

Figure 2 is a plan view, partly in section, showing the connected hollow brake band sections, and Figure 3 shows a fragmentary, edge view thereof.

Figure 1:
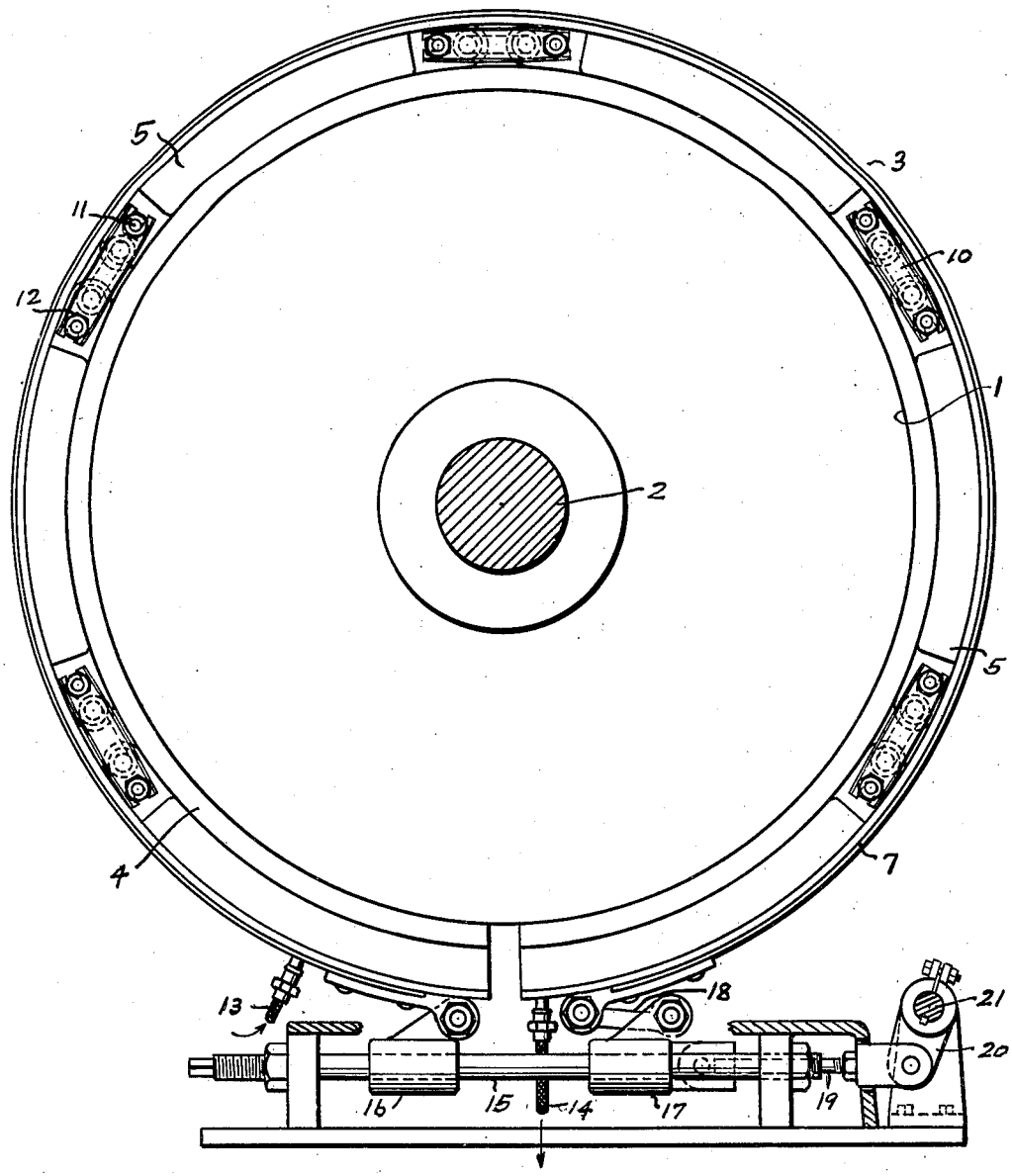
Figure 1 shows an end view of the brake drum showing the brake band and the band operating mechanism, said operating mechanism being shown in section.

Referring now more particularly to the drawings, wherein like numerals of reference designate the same parts in each of the figures, the numeral 1 designates the brake drum which is mounted on the drum shaft 2. Surrounding the brake surface of the drum there is a brake band which is designated as a whole by the numeral 3. This band includes an inner lining 4 which is formed of suitable material for the purpose such as asbestos and around this lining there is the series of hollow sections 5 formed of metal and cast hollow providing the internal chambers 6.

Surrounding the sections 5 there is the metallic band 7 to which said sections may be secured in any suitable manner preferably by set screws. The adjacent ends of the respective sections are inwardly shouldered, as shown in Figure 2 providing the hollow extensions 5a, 5a and fitted to these extensions are the yokes 7. These extensions and the corresponding yokes have the ducts 8 therethrough connecting the chamber 6 of one section with the chamber 6 of the adjacent section. The joints between each yoke and the corresponding sections are rendered fluid tight by means of the sleeve-like packing rings 9, 9 whose ends are countersunk into the yokes and the corresponding extensions 5a. These packing rings surround the corresponding ducts 8.

On the respective yokes are the leaf-springs 10 whose ends are slotted, as shown in Figure 3. Bolts 11 have their inner ends screwed into the corresponding extensions 5a and these bolts are fitted through bearings in the corresponding yoke 7 and through the end slots of the leaf-springs 10. The ends of the leaf-springs 10 are normally outwardly curved as indicated in dotted lines in Figure 2. When assembled the nuts 12 screwed on to the outer ends of the bolts 11 will force the springs 10 into close contact with the yokes, throughout the length of the springs, as shown in full lines in Figure 2, when said nuts are screwed home, thus holding the yokes firmly against the packing rings to form close fitting joints. This construction will allow sufficient flexibility to the brake band to permit it to be set and released without resistance.

An inlet line 13 leads into the chamber of one of the end sections of the brake band and an outlet 14 leads out from the chamber of the other end section of the band. A cooling fluid may thus be circulated throughout the brake band to keep the same cool.

The means for setting and releasing the brake is substantially the same as that shown in my Patent No. 1,992,484 issued February 26, 1935, this mechanism for setting and releasing the brake, however, forming no part of the present invention. As shown there is a track 15 with a yoke 16 fixed thereon and connected to one end of the band. On this track there is a slidable yoke 17 connected to the other end of the band through a link 18. The yoke 16 may be manipulated through the brake rod 19 whose outer end is connected to the brake arm 20 which is fixed on the conventional brake shaft 21.

A brake mechanism of the character described is specially adapted for use on draw-works drums for use in well drilling operations to control the load being let down into, and withdrawn from, wells and in use the friction will generate great heat and for that reason means have been provided for circulating a cooling fluid throughout the brake band to reduce the temperature. However, this type of brake band is adaptable for use generally where heavy duty is required.

The drawings and description disclose what is now considered to be a preferred form of the invention by way of illustration only, while the broad principle of the invention will be defined by the appended claims.

What I claim is:—

1. A brake band having a series of hollow sections therein, rigid yokes connecting adjacent sections and having ducts therethrough for the circulation of a cooling fluid from section to section and means for connecting the yokes to adjacent sections.

2. A brake band having sections therein connected together and provided with internal chambers for a cooling fluid, means connecting said sections, said means including yokes formed of rigid material and connected to adjacent sections, said connecting means having ducts therethrough providing for the circulation of a cooling fluid from chamber to chamber of said sections.

3. A brake band having sections therein connected together and provided with internal chambers for a cooling fluid, means connecting said sections, said means including rigid yokes connected to adjacent sections, said connecting means having ducts therethrough providing for the circulation of a cooling fluid from chamber to chamber of said sections and packing rings forming fluid tight joints between the yokes and the sections connected thereby.

4. In a brake band including a series of sections flexibly connected together and containing circulating chambers for cooling fluid, means connecting said sections together, said connecting means having ducts therethrough for the circulation of the fluid from chamber to chamber, said connecting means comprising rigid yokes and means pivotally connecting the yokes to adjacent ends of the connected sections.

5. In a brake band adjacent sections having chambers therein for cooling fluid, the adjacent ends of the sections having extensions, a rigid connecting yoke, means for pivotally connecting the respective ends of the yoke to the corresponding extensions, said yoke and extensions having a duct leading therethrough and connecting the chambers of said sections.

6. In a brake band adjacent sections each having a chamber therein for cooling fluid, connecting means for connecting said sections, said connecting means having a duct through which said fluid may circulate from one chamber to the other chamber, said connecting means comprising a yoke, a pressure spring on the yoke, means passing through the spring and yoke and connected to the respective sections for securing the spring and yoke assembled with the sections.

7. In a brake band adjacent sections each having a chamber therein for cooling fluid, means connecting the sections together, said connecting means having a duct therethrough leading from one chamber to the other chamber, said connecting means comprising a yoke, sealing means between the yoke and the respective sections, a spring pressing against the yoke, securing means extended through the spring and yoke and connected to the sections for maintaining the assembly in assembled relation.

8. In a brake band adjacent sections having chambers therein for cooling fluid, the adjacent ends of the respective sections being reduced in width providing hollow extensions narrower in width than the main body of the sections, a connecting yoke, means for connecting the respective ends of the yoke to the corresponding extensions, said yoke and extensions having a duct leading therethrough for connecting the chambers of the sections.

LESTER E. HODGES.